Patented July 14, 1953

2,645,553

UNITED STATES PATENT OFFICE 2,645,553

METHOD OF COLORING WOVEN GLASS FIBERS

Charles L. Lawsberg, Easton, Pa., assignor to General Aniline & Film Corporation, New York, N. Y., a corporation of Delaware No Drawing. Application December 29, 1948, Serial No. 68,051

2 Claims. (Cl. 8—8)

This invention relates to an improved process of coloring glass fibers and more particularly to application of dyes to glass fabrics.

Fabrics of glass and particularly of woven glass have recently become important in the field of fabrics where they have a wide variety of uses, and one of their important functions, as the case with most fabrics, is to be decorative. For this function they should be capable of retaining a variety of colors. Great difficulty, however, has been encountered in attempts to dye glass fabric. One method which has been used involves the metalizing of the fiber and applying basic dyes, but this has the disadvantage of presenting a very limited number of colors as well as substantial crocking. Another general method which has been used to dye glass fabrics involves the coating of the fabric with a material such as a gelatin or resin-pigment mixture. This method has the disadvantages of crocking appreciably.

It is, therefore, an object of the present invention to provide a process of coloring glass fibers, which is inexpensive and susceptible of use with a wide variety of dyes.

It is a further object of the present invention to provide a process of coloring glass fibers wherein an even application of dye is effected with a minimum of crocking.

It is a further object of the present invention to provide a process of coloring of glass fibers which gives an even application of bright or dark shades with a wide variety of colors.

These and other objects are attained by the present invention which comprises a process for coloring glass fibers such as woven glass fabrics wherein the glass fibers are first treated with an alkaline material yielding a pH in the range of 9 to 13, preferably a caustic material such as sodium hydroxide. The fibers are preferably simultaneously or further treated with a small amount of resin preferably of the water-soluble type, or alternatively with a compound containing an acid radical, and preferably with a water-soluble inorganic salt.

The treating with the alkaline material usually involves heating the fabric from about 75° C. to boiling in an aqueous solution of alkali as, for example, heating the fabric in a mild sodium hydroxide solution for about an hour. While the alkaline material alone permits a coloring of the fabric not previously possible by a dyeing procedure, the coloring is made considerably more even by the addition of either the salt or the resin, which may be contained in the alkaline bath. It will be understood that in case of the use of a resinous material, the amount used is rather small and the resin need not be set by heat on the fabric as in the case of the prior art resin treating.

The following examples illustrate preferred embodiments of the invention, but it will be understood that the invention is not limited thereto and that substitutions and variations may be made within the scope of the appended claims.

Example 1

100 parts of a woven glass fabric were immersed for 1 hr. in a 75° C.-boiling aqueous solution prepared by mixing 7.2 parts by weight sodium hydroxide and 2 parts of crude lignin sulphonic acid (the product of sulphite treatment of wood pulp one type of which is known by the trade name Hornkem) diluted with water to 3000 parts. The pH of the solution was 11.1. The treating fabric was rinsed in running water for several minutes and then treated with 3000 parts of an aqueous solution containing 3 parts of Benzo Fast Scarlet GS (Color Index 326) for 1 hr. at 90–95° C. The fabric was rinsed in water and dried. The fabric, which had a deep scarlet color evenly distributed, showed good fastness to dry cleaning, substantial fastness to washing and no appreciable crocking.

Example 2

100 parts of a woven glass fabric were immersed for 1 hour at 95° C. in an aqueous solution prepared by mixing 5.1 parts of sodium hydroxide and 3.3 parts of sodium sulfate and diluted with water to 3000 parts. The pH of the solution was 11.1. The treated fabric was rinsed in running water for several minutes then treated with 3000 parts of an aqueous solution containing 3 parts of Pontamine Fast Pink BL (Color Index 353) for 1 hour at 90–95° C. The fabric was evenly colored, fast to dry cleaning, substantially fast to washing and showed no appreciable crocking.

Example 3

100 parts of a woven glass fabric were immersed for about 1 hour in a 75° C. boiling aqueous solution prepared in the following manner:

7.2 parts by weight of caustic soda were dissolved in 2950 parts of water and to this solution 5 parts of hydrochloric acid of 41% concentration were added and the volume of the solution brought to 3000 parts. The pH of the resulting solution was between 11 and 12. The treated fabric was rinsed in running water for several minutes and treated at the boil in 3000 parts of an aqueous solution containing 3 parts of Wool Fast Blue GL extra (Color Index 833). The fabric was rinsed in water. The colored fabric was evenly colored, fast to dry cleaning, substantially fast to washing and had no appreciable crocking.

*Example 4*

100 parts of a woven glass fabric were immersed for 1 hour in a 75° C.-boiling aqueous solution prepared by mixing 7.2 parts of sodium hydroxide with 1 part of a water-soluble formaldehyde-dicyandiamide resin, and diluted with water to 3000 parts. The treated fabric was rinsed in running water for several minutes and then treated in 3000 parts of an aqueous solution containing 3 parts of Fastusol Pink BBA Extra Concentrated dye for 1 hour at 90–95° C. The colored fabric was rinsed in water and dried. The dried fabric was evenly colored a deep shade and had no appreciable crocking.

*Example 5*

100 parts of a woven glass fabric were immersed for 1 hour in a 75° C.-boiling aqueous solution prepared by mixing 7.2 parts of sodium hydroxide with 3000 parts water and 10 parts of animal glue added. The treated fabric was rinsed in running water for several minutes and then colored in 3000 parts of an aqueous solution containing 3 parts of Fastusol Pink BBA Concentrated dye for 1 hour at 75° C. The fabric was rinsed in water and dried. The dried fabric was evenly colored a deep shade and had no appreciable crocking.

*Example 6*

100 parts of a woven glass fabric were immersed for 1 hour in a 75° C.-boiling aqueous solution containing 7.2 parts of sodium hydroxide with 1 part of a water-soluble melamine formaldehyde resin (Melamine FN CIBA), in 3000 parts water. The treated fabric was rinsed in running water for several minutes and then colored in 3000 parts of an aqueous solution containing 3 parts of Fastusol Pink BBA Extra Concentrated dye for 1 hour at 90–95° C. The colored fabric was rinsed in water and dried. The dried fabric was evenly colored a deep shade and had no appreciable crocking.

*Example 7*

100 parts of a woven glass fabric were immersed for 1 hour in a 75° C.-boiling aqueous solution prepared by mixing 7.2 parts of sodium hydroxide with 1 part of a water-soluble formaldehyde-dicyandiamide resin, and diluted with water to 3000 parts. The treated fabric was rinsed in running water for several minutes and then colored in 3000 parts of an aqueous solution containing 3 parts of Wool Fast Blue GLA Extra Concentrated dye for 1 hour at 90–95° C. The fabric was rinsed in water and dried. The dried fabric was evenly colored a deep shade and had no appreciable crocking.

*Example 8*

100 parts of a woven glass fabric were immersed for 1 hour in a 75° C.-boiling aqueous solution prepared by mixing 200 parts of a concentrated ammonium hydroxide and 10 parts of crude lignin sulphonic acid in 3000 parts of water. The treated fabric was rinsed in running water for several minutes and then colored in 3000 parts of an aqueous solution containing 3 parts of Fastusol Pink BBA Extra Concentrated dye for 1 hour at 90–95° C. The fabric was rinsed in water and dried. The fabric had been evenly colored a medium shade and showed no appreciable crocking.

*Example 9*

100 parts of a woven glass fabric were immersed for 1 hr. in a 75° C.-boiling aqueous solution prepared by mixing 100 parts of mono-methylamine and 10 parts of crude lignin sulphonic acid in 3000 parts of water. The treated fabric was rinsed in running water for several minutes and then treated in 3000 parts of an aqueous solution containing 3 parts of Fastusol Pink BBA Extra Concentrated dye for 1 hour at 90–95° C. The colored fabric was rinsed in water and dried. The fabric had been evenly colored a medium shade and showed no appreciable crocking.

The alkaline material used in the present invention is preferably sodium hydroxide, but it may be a number of other organic or inorganic alkaline materials including alkaline salts which are capable of yielding a pH in the range 9 to 13 as, for example, ammonium hydroxide, sodium carbonate, ethanolamine, potassium hydroxide trisodium phosphate, sodium metasilicate lithium carbonate, tripotassium phosphate, etc. The amount used may be varied over a wide range provided a sufficient amount is used to give a pH of at least 9 but an excess of a strong alkali is not as desirable as a lesser amount since it tends to yield less deep coloring. A pH of about 11 is preferable for the best coloring.

The resin used may be any natural or synthetic resinous material which is preferably water soluble such as the formaldehyde-dicyandiamide, animal glue, and melamine formaldehyde resins mentioned in the examples. The amount of resin used will depend upon the type of resin and the amount of water in which it is diluted among other things, but may in general vary from 1 to 20% of the fabric. It will be understood that the amount of resin may be increased even above these amounts, but that the effect may then possibly be a coating as used in the prior art and which this invention avoids.

The acid radical may be introduced in the form of a free acid, an inorganic salt, or an organic compound capable of yielding an acid radical. The amount of this acid radical may be varied over a wide range since some coloring will take place without it, but a more even coloring takes place with the addition of the acid radical or the resins mentioned above. In general, the acid radical may be used in amounts ranging from about 0.01% to about 1%, or even more based upon the weight of the fabric. As examples of acid radicals, the following may be mentioned: borates, chloride sulphates, phosphates, lignin sulfonates, acetates, formates, propionates, etc. These may be conveniently used as alkali metal salts and particularly sodium salts.

The time and temperature of the alkaline treatment may be varied depending upon the alkalinity and other factors. A temperature close to boiling for the treating solution has been found desirable. An alkaline treatment for about 1 hour has also been found to give desirable results. For convenience, the treatment with the acid radical or resin may be simultaneous with the alkaline treatment or may follow it. In addition, the dyeing may take place simultaneously with the alkaline treatment or in a separate bath, which is preferably heated. In the examples 1 hour dyeing is illustrated, but very much shorter periods have been found to give desirable results as, for example, a two-minute bath dyeing, and the method is even useful for padding applications.

The woven glass fabric, which is treated and colored in accordance with this invention, is prepared by making glass strands of a prescribed diameter, twisting the strands into yarn and weaving the same into a fabric. The production of the glass fibers is disclosed in United States Patents 2,068,202 and 2,068,203.

The dyes useful in the present process are, in general, those dyes which do not require chemical reduction in their application (as do vat dyes) and the following are examples:

*Acid dyes*

Wool Fast Violet B (Color Index 833)
Azine Green GB (Color Index 834)
Basle Blue R (Color Index 836)
Polar Red G conc. (Color Index 430)
Alizurol Ruby (Color Index 1091)
Solway Blue SE (Color Index 1053)
Alizarin Sapphire Blue B (Color Index 1054)
Acid Alizarin Blue BB (Color Index 1063)

*Basic dyes*

Union Blue B (Color Index 135)
Janus Grey B, BB (Color Index 137)
Bismarck Brown G (Color Index 331)
Manchester Brown EE (Color Index 332)

*Direct dyes*

Direct Fast Orange SE (Color Index 326)
Chlorazol Fast Scarlet 4BS (Color Index 327)
Diazol Light Yellow N4J (Color Index 349a)
Brilliant Benzo Fast Violet 4BL (Color Index 353a)
Dianol Red 2B (Color Index 434)
Fast Light Yellow G (Color Index 636)
Chlorophenine Y (Color Index 814)
Thioflavine S (Color Index 816)

*Acetate dyes*

The dyes of U. S. 1,805,919, 1,964,971, 1,970,669, and 2,434,765 and like dyes used in dyeing of cellulose acetate may be employed for coloring of the glass fabric.

*Metallized dyes*

The sulfonic-substituted complex metallic compounds of monoazo dyestuffs numbered from 1, 17–19, 20–39, 42, 43, 45, and 56–60 in the table disclosed in the United States Patent 2,008,602, or any one of the water-soluble metallic complexes of monoazo dyes presently employed for dyeing fabrics may be employed for coloring the glass fabric.

The exact theory for the applicant's method of coloring dyeing is not known, but it is believed that the applicant is the first to color glass fabric with a wide range of dyes evenly and in deep shades by an inexpensive process not involving padding with gelatin or resins and yielding a porduct which is fast to dry cleaning and washing, and shows no appreciable crocking.

I claim:

1. The process of coloring a woven glass fabric which consists of treating for about 1 hour said fabric at a temperature in the range 75° C. to the boiling point with an aqueous solution containing an alkaline material, and containing a lignin sulphonic acid, said solution having a pH in the range 9 to 13 and treating said fabric with a dyestuff not requiring a chemical reduction for application.

2. The process for coloring woven glass fabric which consists of treating said fabric for about 1 hour with an aqueous solution containing sodium hydroxide and crude lignin sulphonic acid, and having a pH of about 11 at a temperature of from 75° C. to the boiling point of said aqueous solution, rinsing and treating the fabric with a dyestuff not requiring a chemical reduction for application.

CHARLES L. LAWSBERG.

References Cited in the file of this patent

UNITED STATES PATENTS

| Number | Name | Date |
|---|---|---|
| 2,315,329 | Hood | Mar. 30, 1943 |
| 2,407,483 | Ebaugh | Sept. 10, 1946 |

OTHER REFERENCES

Textile Manufacturers for August 1947, page 381.